(12) United States Patent
Romana et al.

(10) Patent No.: US 10,081,346 B2
(45) Date of Patent: Sep. 25, 2018

(54) BRAKING CONTROL SYSTEM FOR AN AIRCRAFT

(71) Applicants: AIRBUS OPERATIONS LIMITED, Bristol (GB); AIRBUS OPERATIONS SAS, Toulouse (FR)

(72) Inventors: Louis-Emmanuel Romana, Bristol (GB); Miguel Angel Gama, Bristol (GB); Andrea Damiani, Bristol (GB)

(73) Assignees: Airbus Operations Limited, Bristol (GB); Airbus Operations (S.A.S.), Toulouse (FR)

( * ) Notice: Subject to any disclaimer, the term of this patent is extended or adjusted under 35 U.S.C. 154(b) by 69 days.

(21) Appl. No.: 15/205,783

(22) Filed: Jul. 8, 2016

(65) Prior Publication Data

US 2017/0008503 A1 Jan. 12, 2017

(30) Foreign Application Priority Data

Jul. 8, 2015 (GB) .................................. 1511967.0

(51) Int. Cl.
*B60T 17/22* (2006.01)
*B60T 8/17* (2006.01)
(Continued)

(52) U.S. Cl.
CPC ............ *B60T 17/221* (2013.01); *B60T 8/172* (2013.01); *B60T 8/1703* (2013.01); *B60T 8/885* (2013.01);
(Continued)

(58) Field of Classification Search
CPC .................................................. B60T 17/221
See application file for complete search history.

(56) References Cited

U.S. PATENT DOCUMENTS

| 4,043,607 A | 8/1977 | Signorelli et al. |
| 4,430,715 A | 2/1984 | Gentet et al. |

(Continued)

FOREIGN PATENT DOCUMENTS

| BR | PI1000069-0 | 3/2011 |
| FR | 2 918 637 | 1/2009 |

(Continued)

OTHER PUBLICATIONS

Search Report cited in GB Patent Application No. 1511967.0, dated Jan. 25, 2016, three pages.

(Continued)

*Primary Examiner* — Adam D Tissot
*Assistant Examiner* — Michael Andrew Berns
(74) *Attorney, Agent, or Firm* — Nixon & Vanderhye P.C.

(57) ABSTRACT

A braking control system for an aircraft having braking wheels, the braking control system being configured to receive input of signals from sensors representative of a plurality of measured aircraft parameters, and to output a plurality of brake commands to brakes associated with the braking wheels, wherein the braking control system includes a health monitoring system for determining the operability and/or reliability of the sensor signals and/or of the braking wheels, and a task manager for automatically self-reconfiguring the braking control system so as to change the manner in which the braking control system utilises the input signals in the event that the health monitoring system judges a failure of one or more of the braking wheels or sensor signals. Also a method for operating an aircraft having a plurality of braking wheels.

20 Claims, 6 Drawing Sheets

(51) Int. Cl.
  *B64C 25/42* (2006.01)
  *B60T 8/172* (2006.01)
  *B60T 8/88* (2006.01)

(52) U.S. Cl.
  CPC ......... *B64C 25/42* (2013.01); *B60T 2270/402* (2013.01)

(56) References Cited

U.S. PATENT DOCUMENTS

| | | | |
|---|---|---|---|
| 4,790,606 A * | 12/1988 | Reinecke | B60T 8/00 188/1.11 E |
| 4,822,113 A | 4/1989 | Amberg et al. | |
| 4,958,512 A | 9/1990 | Johnsen | |
| 5,381,337 A | 1/1995 | Burgess | |
| 5,390,990 A | 2/1995 | Cook et al. | |
| 5,785,158 A * | 7/1998 | Grimm | F16D 55/28 188/134 |
| 6,036,285 A * | 3/2000 | Murphy | B60T 8/17616 188/181 T |
| 6,390,571 B1 | 5/2002 | Murphy | |
| 7,865,289 B2 * | 1/2011 | Dellac | B60T 8/1703 244/111 |
| 8,538,064 B2 | 9/2013 | Rhoads et al. | |
| 8,538,604 B2 * | 9/2013 | Thibault | B60T 8/1703 244/111 |
| 8,634,971 B2 * | 1/2014 | Cahill | B60T 8/00 188/1.11 L |
| 9,056,673 B2 * | 6/2015 | Raby | B60T 8/1703 |
| 9,715,770 B2 * | 7/2017 | Cahill | G07C 5/0808 |
| 9,809,302 B2 * | 11/2017 | Howell | B64C 25/48 |
| 2004/0239173 A1 | 12/2004 | Williams et al. | |
| 2005/0231030 A1 | 10/2005 | Frank | |
| 2005/0231031 A1 | 10/2005 | Bellouard et al. | |
| 2005/0246086 A1 * | 11/2005 | Motosugi | B60T 7/12 701/78 |
| 2006/0226698 A1 | 10/2006 | Riebe et al. | |
| 2007/0132311 A1 * | 6/2007 | Giazotto | B60T 8/1703 303/126 |
| 2007/0179686 A1 | 8/2007 | DeVlieg et al. | |
| 2008/0174385 A1 | 7/2008 | Johansson et al. | |
| 2008/0201025 A1 | 8/2008 | Dellac et al. | |
| 2008/0258548 A1 | 10/2008 | May et al. | |
| 2009/0065640 A1 * | 3/2009 | Regis | B60T 8/1703 244/111 |
| 2009/0210126 A1 | 8/2009 | Dellac et al. | |
| 2009/0276133 A1 | 11/2009 | May et al. | |
| 2010/0013296 A1 | 1/2010 | Raby et al. | |
| 2010/0063703 A1 | 3/2010 | Clothier | |
| 2010/0106347 A1 | 4/2010 | Cahill | |
| 2010/0250027 A1 | 9/2010 | DeVlieg et al. | |
| 2010/0250028 A1 | 9/2010 | DeVlieg | |
| 2010/0256884 A1 | 10/2010 | DeVlieg | |
| 2011/0077833 A1 | 3/2011 | Rado | |
| 2015/0142388 A1 * | 5/2015 | Metzger | B60T 8/1703 702/189 |
| 2016/0355256 A1 * | 12/2016 | Gama-Valdez | B60T 8/1703 |
| 2017/0011568 A1 * | 1/2017 | Romana | B64C 25/10 |

FOREIGN PATENT DOCUMENTS

| | | |
|---|---|---|
| GB | 2 411 969 | 9/2005 |
| GB | 2 458 378 | 9/2009 |
| GB | 2 460 322 | 12/2009 |
| GB | 2 463 752 | 3/2010 |
| WO | 2008147579 | 12/2008 |

OTHER PUBLICATIONS

Extended European search report cited in EP Patent Application No. 16177441.9, dated Nov. 24, 2016 (8 pages).

* cited by examiner

| Variable | Description | Units |
|---|---|---|
| $BG$ | Measured Brake Gain | Nm/Bar |
| $DB_{ACTIVE}$ | DB Activation for Slip Protection | wu |
| $F_{AC}*$ | AC X-Force Command | N |
| $Fx$ | LG Actuation X-Force | N |
| $Fx*$ | X-Force Command for ATA32 | N |
| $Fx,y,z_M$ | MLG X-, Y-, or Z-Force | N |
| $Fx,y,z_N$ | NLG X-, Y-, or Z-Force | N |
| $Fx_c$ | Corrected X-Force | N |
| $Fx_{NLG}$ | LG Reaction X-Force | N |
| $Fx_M*$ | MLG X-Force Command | N |
| $Fx_{max}$ | Max X-Force at ATA32-level | N |
| $Fy_N*$ | NLG Y-Force Command | N |
| $Fy_{N\ max}$ | Max NLG Y-Force due to Slip Protection | N |
| $BSCS_{Status}$ | BSCS operating status | wu |
| $Mz$ | LG Actuation Z-Moment | Nm |
| $Mz*$ | Z-Moment Command for ATA32 | Nm |
| $Mz_{AC}*$ | AC Z-Moment Command | Nm |
| $Mz_c$ | Corrected Z-Moment | Nm |
| $Mz_{DB\ max}$ | Max Moment due to DB | Nm |
| $Mz_{MLG}$ | LG Reaction Z-Moment | Nm |
| $Mz_{St\ max}$ | Max Moment due to Steering | Nm |
| $P_{COM}$ | Brake Pressure Command | Bar |
| $P_W$ | Brake Pressure | Bar |
| $r$ | Yaw Rate | deg/s |
| $r*$ | Yaw Rate Command | deg/s |
| $S_{NW}$ | Nose Wheel Slip Angle | deg |
| $Te_W$ | Brake Temperature | degC |
| $T_{LG}*$ | LG Torque Command | Nm |
| $T_W$ | Braking Torque | Nm |
| $T_W*$ | Brake Torque Command | Nm |
| $U$ | AC Longitudinal Speed | m/s |
| $U*$ | Speed Command | m/s |
| $U'$ | AC Acceleration | m/s2 |
| $U'*$ | Acceleration Command | m/s2 |
| $V$ | AC Lateral Speed | m/s |
| $\beta$ | NLG DoT Command | deg |
| $\theta_{NW}$ | Nose Wheel Angle | deg |
| $\theta_{NW}*$ | Nose Wheel Angle Command | deg |
| $\theta$ | Optimisation Coefficients | wu |
| $\kappa$ | Moment Dispatch Coefficient | wu |
| $\kappa_{DB}$ | DB Authority | wu |

FIG. 4

BRAKING CONTROL SYSTEM FOR AN AIRCRAFT

RELATED APPLICATION

This application claims priority to Great Britain Patent Application 1511967.0 filed Jul. 8, 2015, the entirety of which is incorporated by reference.

FIELD OF THE INVENTION

The present invention relates to a braking control system for an aircraft having a plurality of braking wheels and a method for operating an aircraft having a plurality of braking wheels.

BACKGROUND OF THE INVENTION

A typical aircraft has landing gear comprising a plurality of undercarriages which support the aircraft when it is on the ground. The undercarriages are used to control the movement of the aircraft during ground maneuvers such as landing, taxiing and take off. Some of the undercarriages have braking wheels which are operable to provide a braking force to decelerate the aircraft when a braking torque is applied by a set of brakes.

In use, the braking torque generated by each braking wheel of the aircraft may vary, for example due to differences in brake gain (the ratio of the actual braking torque to the clamping force used to control the braking torque). Variations in brake torque across the braking wheels may cause variations in loading of the undercarriages, therefore increasing the design requirements and also the weight of the aircraft. Variations in brake torque may also lead to asymmetric braking (the generation of uneven braking forces either side of the aircraft center-line) resulting in a net yaw moment which may need to be corrected by a pilot or control system, increasing pilot and control system workload.

In use, the brakes may also heat up at different rates, for example due to variations in brake gain, resulting in temperature scatter (temperature differentials between the brakes). Temperature scatter may lead to increased aircraft turn-around time or TAT (the time for which an aircraft is grounded before a flight) and increased wear rates of brake system components.

Controlling temperature scatter and variations in brake torque may be particularly difficult in failure modes, where the ability of a braking system to function optimally may be impaired.

It is therefore desirable to provide a braking system for an aircraft which addresses these problems and allows an aircraft to perform ground maneuvers with maximum efficiency within the available performance envelope, particularly in failure modes when performance may be reduced.

SUMMARY OF THE INVENTION

A first aspect of the invention provides a braking control system for an aircraft having a plurality of braking wheels, the braking control system being configured to receive input of signals from sensors representative of a plurality of measured aircraft parameters, and to output a plurality of brake commands to brakes associated with the braking wheels, wherein the braking control system includes a health monitoring system for determining the operability and/or reliability of the sensor signals and/or of the braking wheels, and a task manager for automatically self-reconfiguring the braking control system so as to change the manner in which the braking control system utilises the input signals in the event that the health monitoring system judges a failure of one or more of the braking wheels or sensor signals.

A further aspect of the invention provides a method for operating an aircraft having a plurality of braking wheels, the method comprising receiving input of signals from sensors representative of a plurality of measured aircraft parameters, outputting a plurality of brake commands to brakes associated with the braking wheels, determining the operability and/or reliability of the sensor signals and/or of the braking wheels, and automatically self-reconfiguring the manner in which the input signals are utilised in the event that a failure of one or more of the braking wheels or sensor signals is determined.

The invention is advantageous in that it allows the optimised distribution of torque among a plurality of braking wheels according to input data from sensors providing one or more feedback loops, and provides the capability to reconfigure the use of the input data in response to failures to maintain optimised control of the distribution of torque.

The aircraft parameters may include one or more of: aircraft speed, aircraft longitudinal braking force, wheel brake torque, wheel brake temperature, wheel brake pressure, or aircraft weight. Alternatively, the aircraft parameters may include any other properties of an aircraft or braking system which may affect the performance of the aircraft during ground manoeuvres. The aircraft parameters may be used to provide feedback signals for optimising the distribution of braking torque among the braking wheels.

The braking control system may be further configured to receive a total braking force commanded to be developed, in use, by the available braking wheels of the aircraft.

The braking control system may be configured to minimise any error between the commanded braking force and the actual braking force developed, in use, by the braking wheels.

By minimising the error between the commanded braking force and the actual braking force, the braking control system may improve control of the braking force generated by the braking wheels, therefore improving control of the aircraft during ground manoeuvres and decreasing the pilot and control system workloads. Minimising the error may also help to control undercarriage loading so that the loading requirements of aircraft undercarriages may be decreased, reducing weight and improving fuel consumption of the aircraft.

The braking control system may be further configured to equalise the torque applied by the brake actuators to the available braking wheels.

By equalising the torque applied across the braking wheels the braking performance may be increased, loading of the undercarriages may be controlled and asymmetric braking may be reduced or eliminated.

The braking control system may be further configured to equalise the brake temperature of the available braking wheels.

By equalising brake temperature across the braking wheels the aircraft TAT may be reduced, the wear rate of brake system components may be reduced and performance variations between the brakes due to temperature differences may be minimised.

The braking control system may be further configured to optimise usage of the available braking wheels by trading brake torque equalisation against reducing brake temperature scatter.

By optimising usage according to a trade-off between torque equalisation and temperature equalisation the braking control system may prioritise either equalising torque or equalising brake temperature according to the current needs of the aircraft, for example in response to a need for rapid deceleration and improved stability or a need to reduce a significant temperature differential.

The braking control system may be further configured to estimate a brake gain of each braking wheel based upon input signals representative of the brake torque and brake pressure for that wheel.

By estimating the brake gain of each wheel the actual braking torque delivered at each wheel may be more accurately controlled, thereby reducing pilot and control system workloads and controlling undercarriage loading. The braking torque may also be maintained at a commanded level despite variations in brake gain.

The braking control system may be further configured to estimate a runway-tire friction coefficient based upon input signals representative of the aircraft weight and either the total braking torque or the aircraft longitudinal braking force developed in use.

By measuring the runway coefficient, the actual braking torque delivered at each wheel may be more accurately controlled and an additional anti-slip back-up system may be provided to prevent wheel skidding and a resulting loss in braking performance.

The input signals from the sensors may be representative of real-time measured aircraft parameters to provide closed-loop braking control. The braking control system may therefore adapt the brake commands to each braking wheel according to the current operating conditions.

At least some of the input signals may be estimates of some aircraft parameters based upon other measured aircraft parameters to provide open-loop braking control.

The system may automatically revert to open-loop control when closed-loop control is unavailable or is unreliable.

By enabling open loop control, functionality of the braking control system may be maintained when feedback data from some sensors is unavailable.

One or more functions of the system may be selectively enabled without disrupting continuous operation of the braking system.

By selectively enabling different functions or control loops of the braking control system, the system may adapt the way in which input data is used to prioritise different functions according to specific needs or operational circumstances.

The function(s) may be enabled by a pilot-controlled input and/or automatically based upon aircraft operating conditions.

The task manager may generally control the operation of any number of feedback loops of any type which are used to modify or control brake commands output by the braking control system.

BRIEF DESCRIPTION OF THE DRAWINGS

Embodiments of the invention will now be described with reference to the accompanying drawings, in which FIG. 1.

FIG. 4 is a table of symbols used in FIGS. 2 and 3.

DETAILED DESCRIPTION OF EMBODIMENT(S)

Figure 1A:
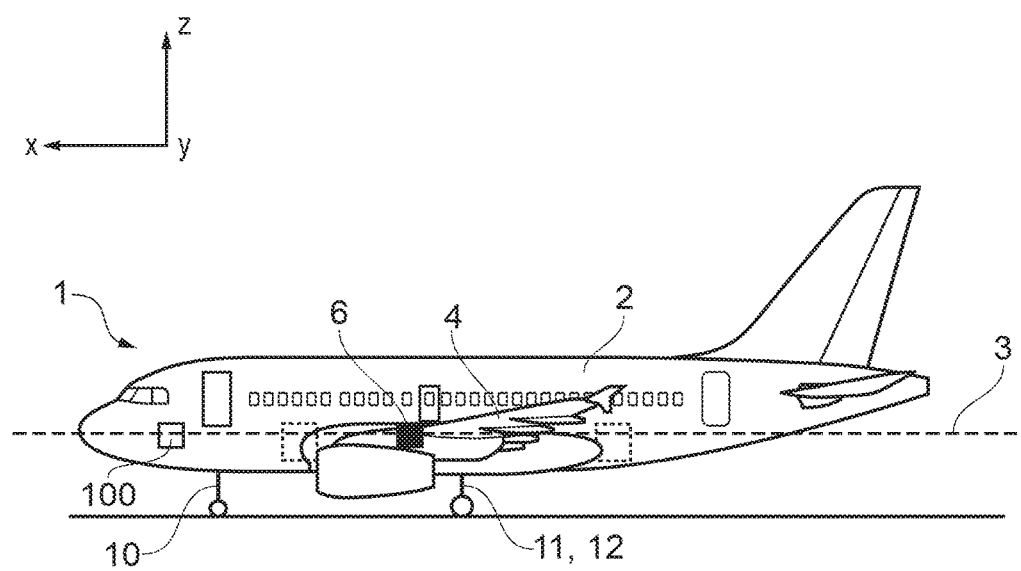
FIGS. 1a and 1b show an aircraft.
Figure 1B:
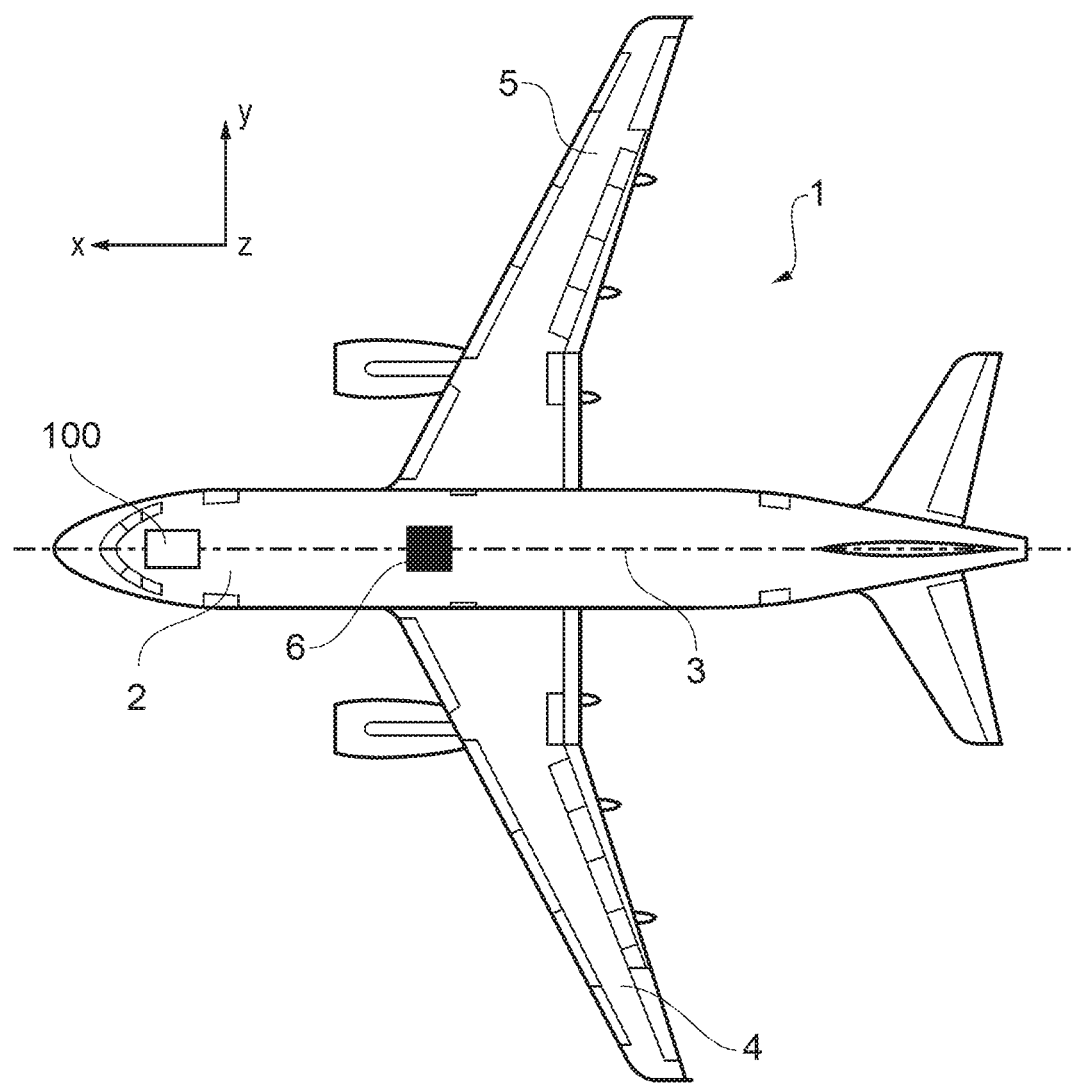

FIGS. 1a and 1b show an aircraft 1 having a fuselage 2 with a longitudinal axis 3 and wings 4, 5 extending outwardly from the fuselage. The aircraft 1 defines a set of axes with a longitudinal x direction parallel to the longitudinal axis of the aircraft, a lateral y direction perpendicular to the x axis, and a vertical z direction perpendicular to the x and y axes. The aircraft 1 has a centre of gravity 6.

The aircraft has landing gear which supports the aircraft when it is on the ground and controls the movement of the aircraft during ground maneuvers such as landing, taxiing and take-off. The landing gear comprises a nose landing gear (NLG) undercarriage 10 and port and starboard main landing gear (MLG) undercarriages 11, 12 either side of the center line. The landing gear may be retracted when the aircraft 1 is in flight and extended before landing.

Figure 1C:
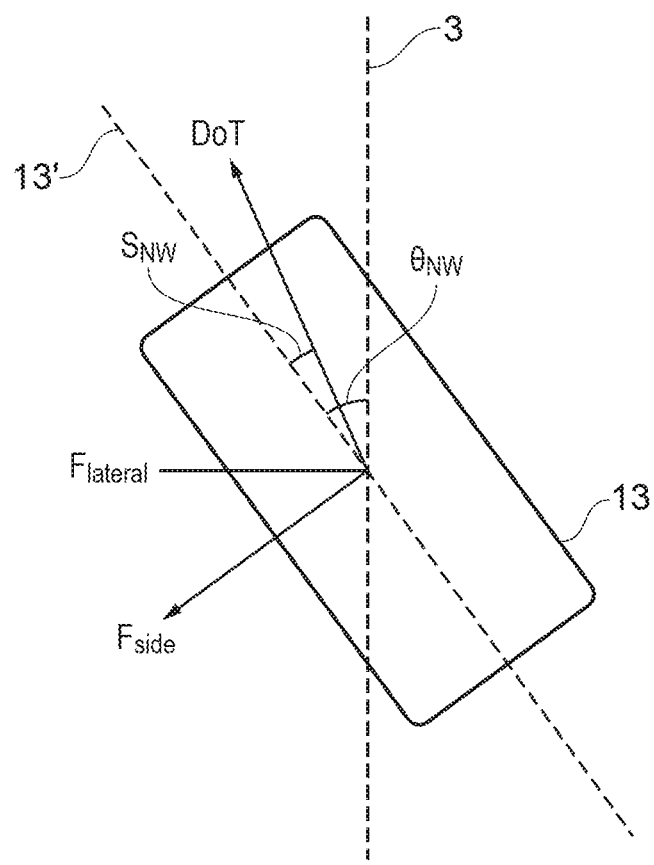
FIG. 1c shows a plan view of a steerable nose landing gear.

The NLG undercarriage 10 has a pair of steering wheels 13 which may be rotated by a steering actuator to steer the aircraft. The nose wheel angle $\theta_{NW}$ is defined as the angle between the direction in which the steering wheels are facing 13' (that is the direction in which the wheels roll in a direction perpendicular to the axis of rotation) and the longitudinal axis 3 of the aircraft 1, as indicated in FIG. 1c. The direction of travel of the aircraft (DoT) is defined as the direction of the speed vector of the NLG undercarriage 10 with respect to the longitudinal axis 3 of the aircraft 1. The nose wheel angle $\theta_{NW}$ may be varied to control the direction of travel of the NLG undercarriage 10, thereby controlling the heading of the aircraft.

When the steering wheels 13 are not aligned with the DoT, an angle known as the nose wheel slip angle $S_{NW}$ is created between the direction in which the steering wheels are facing 13' and the DoT. When the steering wheels 13 are operated with a slip angle, a side force $F_{side}$ having a lateral component $F_{lateral}$ (in the y direction) is generated which results in a turning moment or yaw moment which acts to turn the aircraft. The net yaw moment being generated in a particular direction may, therefore, be increased or decreased by applying a slip angle.

The MLG undercarriages 11, 12 each have a plurality of braking wheels 14 which may be operated to decelerate the aircraft. Each braking wheel is operated by using a brake actuator to apply a clamping force to a stack of carbon brake disks (stators and rotors) which transfers a braking torque to the braking wheel, resulting in a longitudinal deceleration force being transferred to the aircraft 1. The longitudinal braking force generated by each braking wheel may be controlled by operating the actuators to control the brake pressure of each brake. The brakes used in the embodiment described below may have a hydraulic brake actuator but a skilled person would appreciate that a similar control system using corresponding control methods could be employed regardless of the type of brakes, and could, for example be applied to an aircraft having electromechanical brake actuation and/or regenerative brakes.

In addition, the braking wheels may be used to help steer the aircraft through differential braking. Differential braking (DB) is the intentional application of unbalanced braking forces either side of the aircraft center line 3 to generate a net yaw moment to steer the aircraft. DB may conventionally be achieved by asymmetric deflection of a pair of brake control devices for controlling port and starboard braking undercarriages. Braking and steering operations may also be assisted by other systems, for example spoilers and other control surfaces and the aircraft's engines.

The aircraft 1 includes a cockpit device for longitudinal control which is used to control deceleration of the aircraft and which outputs signals representative of a desired speed or deceleration, i.e. a speed command U* or a deceleration command U'*. The aircraft 1 also includes a cockpit device for lateral control which is used to steer the aircraft and which outputs signals representative of a desired direction of travel (DoT) and yaw rate, i.e. a DoT command β and a yaw rate command r*.

Figure 2:
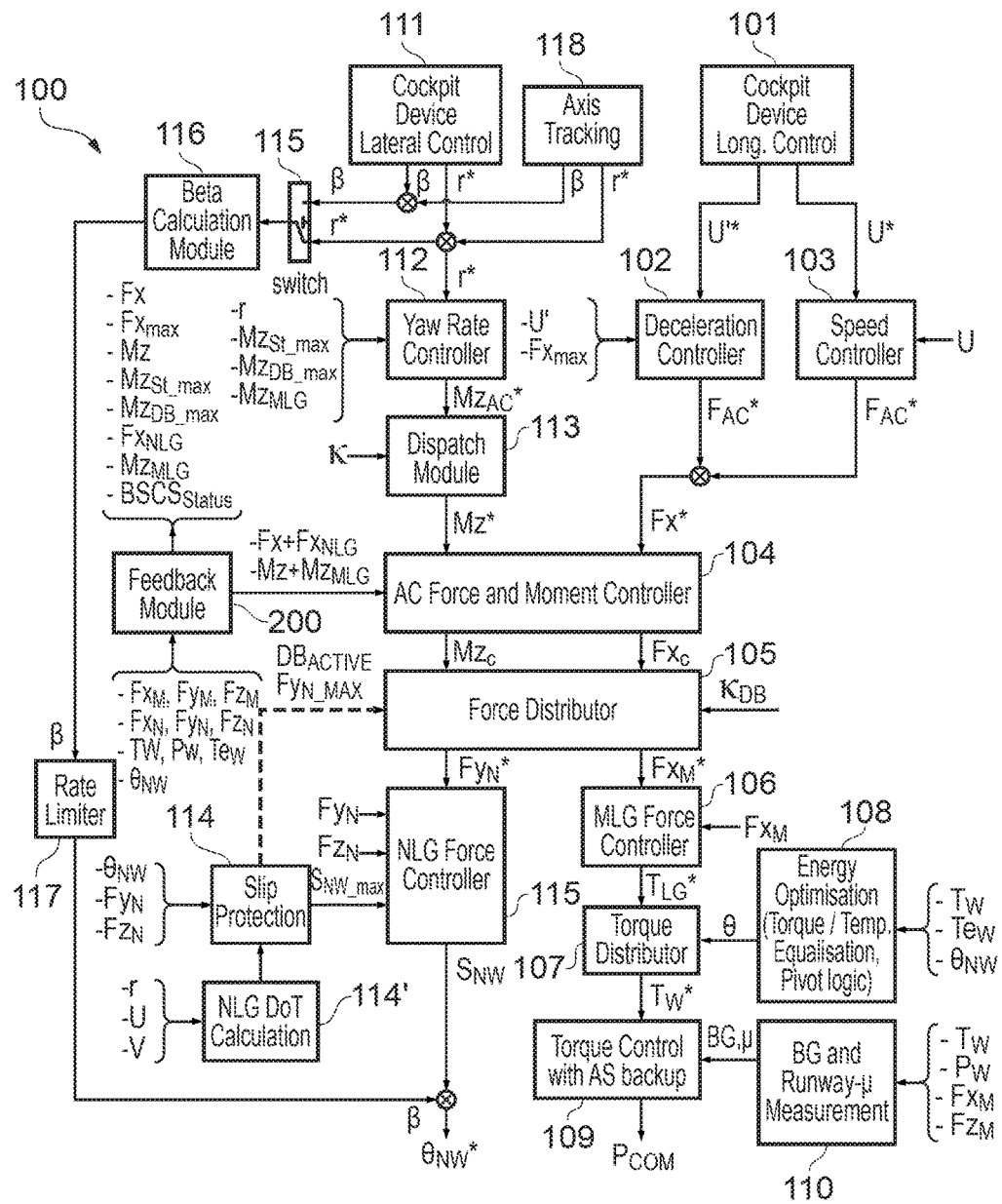
FIG. 2 shows a braking and steering control system.
Figure 3:
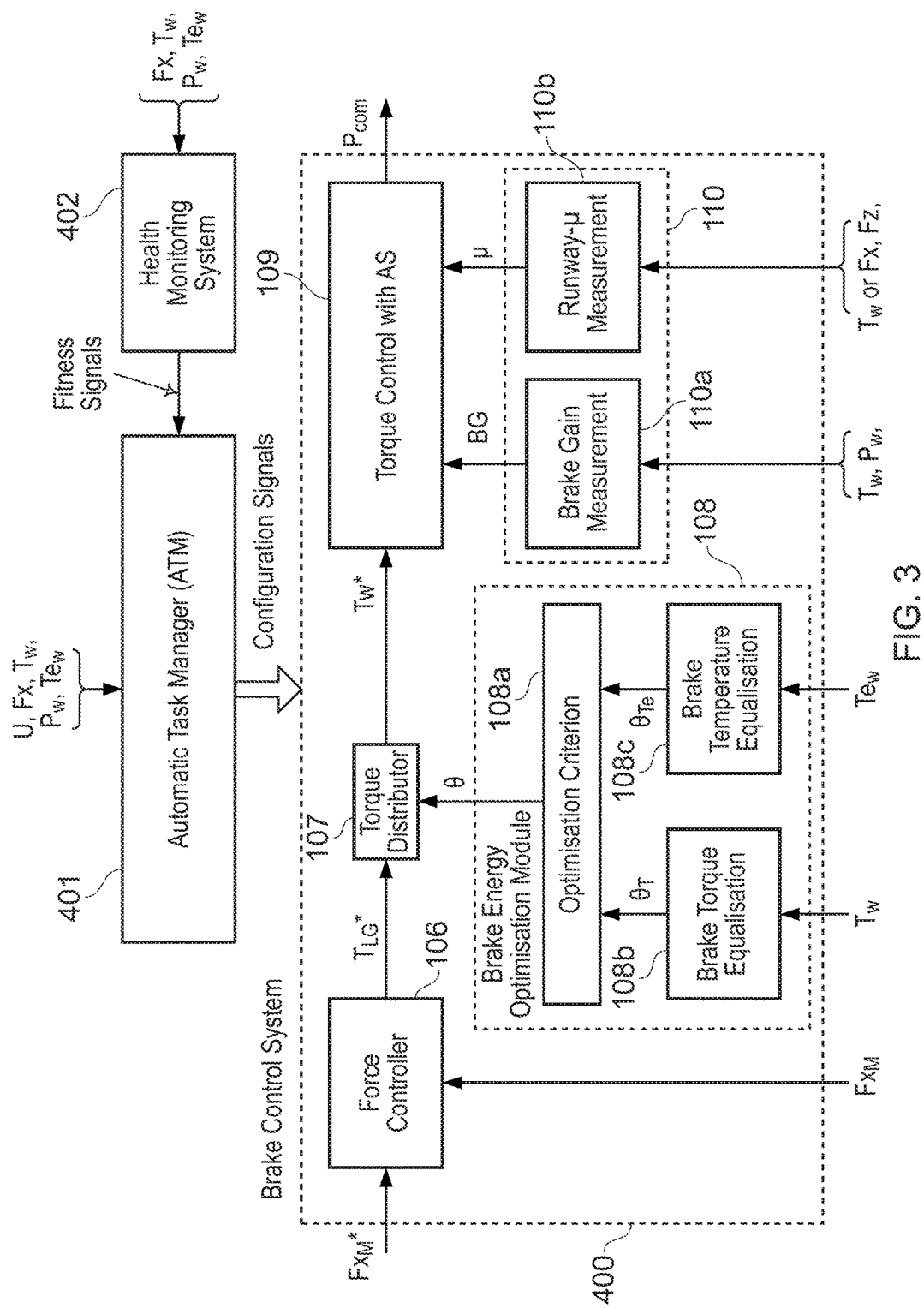
FIG. 3 shows a part of the steering and control system of FIG. 2.

FIG. 2 shows a braking and steering control system 100 of the aircraft. FIG. 3 shows an enlarged view of a part of the control system 100 according to one embodiment of the invention. The part of the control system shown in FIG. 3 receives a signal representative of a braking force command to be achieved by the braking wheels 14 of the aircraft landing gear and divides the braking force command between the braking wheels to promote even and efficient distribution of braking force and to reduce temperature scatter, especially in the event of component or sensor failures in the braking system.

The braking and steering control system 100 is generally configured to receive input commands representative of a desired speed U*, deceleration U'*, DoT β or yaw rate r* and to transmit output commands representative of a desired brake pressure or nose wheel angle—brake pressure command $P_{COM}$ and nose wheel angle command $\theta_{NW}^*$—to braking and steering actuators to control the operation of the braking and steering wheels in accordance with the input commands.

Each deceleration command U'* output by the longitudinal control device 101 is received by a deceleration controller 102 which also receives data representative of the current aircraft acceleration U' and the maximum achievable braking force $Fx_{max}$ to be generated by the MLG undercarriages 11, 12 from a feedback module 200. The deceleration controller 102 uses this data to determine the longitudinal braking force required to achieve the commanded deceleration for the aircraft 1 and outputs this value as a longitudinal force command $F_{AC}^*$.

Each speed command U* output by the longitudinal control device 101 is similarly received by a speed controller 103 which also receives data representative of the current aircraft speed U. The speed controller 103 applies a speed control law and outputs a longitudinal force command $F_{AC}^*$ representative of the longitudinal braking force required to achieve or maintain the commanded aircraft speed.

The longitudinal force command $F_{AC}^*$ (originating either as an acceleration command or a speed command) is received by an aircraft force and moment controller 104 as an x direction force command Fx*. The aircraft force and moment controller 104 also receives data representative of the longitudinal braking force Fx and the NLG x-direction reaction force $FX_{NLG}$ from a feedback module 200. The force and moment controller 104 uses the current MLG undercarriage longitudinal forces to apply a correction to minimise the error in the x direction force command Fx*, and outputs a corrected force command $Fx_c$.

A force distributor 105 receives the corrected force command $Fx_c$ and splits the total command into two MLG braking force commands $Fx_M^*$ representative of the braking force to be achieved by each of the MLG undercarriages 11, 12. After the force distributor 105, the braking and steering control system 100 includes two parallel branches, one for each MLG undercarriage. Both of the MLG undercarriages 11, 12 have similar control system elements downstream of the force distributor 105. For clarity, FIG. 1 only shows one of the MLG force commands $Fx_M^*$ being output to one of the MLG undercarriages. FIG. 3 shows a brake control system (BCS) 400 for one of the MLG undercarriages (hereafter referred to as the MLG undercarriage) which receives a MLG force command $Fx_M^*$. However, both of the MLG undercarriages receive a MLG force command $Fx_M^*$ and control braking of their braking wheels using a similar system.

The BCS 400 has a force controller 106 which receives the MLG force command $Fx_M^*$ from the force distributor. The force controller 106 also receives a longitudinal force feedback signal $Fx_M$ representative of the actual current longitudinal force generated by the MLG undercarriage from a load sensor in the MLG undercarriage structure. The MLG force controller 106 determines and outputs a landing gear torque command $T_{LG}^*$ representative of the total braking torque to be generated by the braking wheels 14 of the undercarriage to achieve the commanded braking force, using the current longitudinal force $Fx_M$ feedback loop to minimise any error between the commanded braking force and the actual braking force developed by the MLG undercarriage.

The feedback loop reduces the error in the force signal so that the torque generated by the braking wheels of each undercarriage may be more accurately and effectively controlled, thereby decreasing pilot and control system workloads. The feedback loop also improves control of MLG undercarriage loading, so that the design requirements for the undercarriages are reduced and the weight may be reduced, thereby increasing aircraft fuel efficiency.

The BCS 400 has a torque distributor 107 which receives the landing gear torque command $T_{LG}^*$ and divides it into a plurality of wheel brake torque commands $T_W^*$ representative of the braking torque to be achieved by the brake of each of the respective braking wheels 14 of the MLG undercarriage. For clarity FIG. 3 only shows one brake torque command $T_W^*$ being output to one brake but a separate torque command is output by the torque distributer to each of the brakes of the MLG undercarriage. The torque distributor 107 divides the total torque command $T_{LG}^*$ among the brakes according to a set of optimisation coefficients θ received from a brake energy optimisation module 108 for each braking wheel.

The brake energy optimisation module 108 includes a brake torque equalisation module 108b which receives a signal representative of the braking torque $T_w$ generated at each wheel of the MLG undercarriage and establishes a torque coefficient $\theta_T$ for each braking wheel representative of a desire to equalise the braking torque with that of the other braking wheels. The brake energy optimisation module 108 also includes a brake temperature equalisation module 108c which receives a signal representative of the brake temperature $Te_w$ of each wheel brake of the MLG undercarriage and establishes a temperature coefficient $\theta_{Te}$ for each braking wheel representative of a desire to equalise the brake temperature with that of the other wheel brakes.

The torque coefficients $\theta_T$ and temperature coefficients $\theta_{Te}$ for each braking wheel of the MLG undercarriage are received by an optimisation criterion module 108a of the brake energy optimisation module 108 which applies a weighting to each set of coefficients. The weighted sum of the coefficients for each wheel is used to establish an optimised coefficient θ for each wheel. The sum of the optimised coefficients for all of the braking wheels is equal to 1. The optimised coefficients θ are received by the torque distributor 107 which multiplies the landing gear torque command $T_{LG}*$ by the optimised coefficients to determine the proportion of the landing gear torque command TLG* which should be sent to each wheel as a wheel brake torque command $T_W*$.

The torque coefficients $\theta_T$ therefore enable the BCS to distribute torque commands $T_W*$ among the braking wheels in such a way as to equalise braking torque, thereby maximising braking performance, increasing control of loading of the undercarriages and reducing asymmetric braking. The temperature coefficients $\theta_{Te}$ enable the BCS to distribute torque commands $T_W*$ among the braking wheels in such a way as to equalise brake temperatures (i.e. to minimise temperature scatter), thereby reducing aircraft TAT, reducing wear rates of brake components and reducing performance variations between wheels due to different brake temperatures. The weighting assigned to the torque coefficients $\theta_T$ and temperature coefficients $\theta_{Te}$ may be varied according to the priority assigned to equalising torque and equalising temperature as dictated by an automatic task manager (described below).

Each of the braking wheels has a brake pressure controller or torque controller 109 which receives the brake torque command $T_W*$ for that particular wheel and outputs a brake pressure command $P_{COM}$ representative of the brake pressure to be generated at the brake for that wheel. The brake pressure commands $P_{COM}$ for each braking wheel 14 are received by the brake actuators for each of the respective braking wheels which apply pressure to the brakes in accordance with the brake pressure commands $P_{COM}$, thereby decelerating the aircraft 1.

Each braking wheel also has a brake gain measurement unit 110a which calculates BG using inputs of brake torque $T_w$ and brake pressure $P_w$ for that wheel and a runway-μ measurement unit 110b which calculates the tire-runway friction coefficient μ using inputs of brake torque $T_w$ for that wheel and longitudinal and vertical undercarriage load Fx and Fz. For clarity the two measurement units are shown as a single block 110 in FIG. 2.

The BG and friction coefficient μ are transmitted to the torque controller 109 in a closed feedback loop, and the torque controller uses these values in calculating the required brake pressure at its brake to achieve the commanded brake torque. The brake pressure controller 109 has anti-skid (AS) functionality to reduce or eliminate skidding by limiting the brake pressure command $P_{COM}$ if the wheel begins to skid. The friction coefficient μ may also be used to provide friction limited torque control by limiting the brake torque command $T_W*$ according to the measured friction coefficient as an additional anti-skid measure.

By providing BG and tire-runway friction coefficient feedback, the brake gain measurement unit 110a and runway-μ measurement unit 110b improve control of the braking torque generated at each wheel by reducing variations in torque due to brake gain and tire/runway conditions. By controlling variations in braking torque, the performance of the brakes can be more efficiently and easily controlled, thereby improving braking performance and reducing pilot and control system workloads. The feedback loop also improves control of loading of the landing gear so that the design requirements are reduced and the weight of the landing gear may be reduced, improving the fuel efficiency of the aircraft. The runway friction coefficient μ may also be used to control the braking torque to prevent the braking wheels from skidding.

The BCS 400 also includes an automatic task manager (ATM) 401 and a health monitoring system (HMS) 402. The HMS 402 is configured to determine the operability of the brake actuators and the validity of the signals received by the BCS 400 from various sensors. The HMS makes its determinations using correlation analysis on the data received form the sensors. The correlation analysis compares measured quantities in order to establish the probability that a linear relationship exists between the two quantities, indicating whether or not the measured quantities are within a moving range of acceptable values according to an expected correlation.

The ATM 401 receives signals representative of aircraft speed U, undercarriage longitudinal loading Fx, wheel torques $T_w$, wheel brake pressures $P_w$ and wheel brake temperatures $Te_w$ and communicates with the other elements of the BSC 400 to configure the BCS. Specifically, the ATM 401 dictates how the input signals to the brake energy optimisation module 108, brake gain measurement unit 110a and runway-μ measurement unit 110b are used to control the distribution of torque among the braking wheels. In particular, the ATM 401 is adapted to automatically reconfigure the BCS in response to certain events to maximise braking performance, maintain effective distribution of braking torque and reduce temperature scatter under various normal and failure conditions. Braking performance of the aircraft 1 is, therefore, optimised in normal, failing and degraded conditions and in failure modes.

In normal operation the ATM 401 may establish a trade-off between equalising brake torque and equalising brake temperature between the braking wheels and assign a relative priority to each. The ATM 401 may then reconfigure the BCS 400 by varying the weighting applied to the torque coefficients $\theta_T$ and temperature coefficients $\theta_{Te}$ for each braking wheel 14, thereby prioritising the equalisation one or the other of torque or temperature equalisation. The ATM may, for example, determine the relative priority by considering the current levels of variation in brake torque and brake temperature between the wheels.

If, for example, a torque sensor for a braking wheel 14 fails, the HMS detects the sensor failure and reports the failure to the ATM 401. The ATM 401 then reconfigures the BCS 400 to use the maximum torque measurement $T_w$ from the other braking wheels in the place of the missing torque measurement. In this way torque equalisation may remain operational despite the sensor failure but with a bias towards the wheel generating the highest braking torque.

If there is a failure affecting a brake actuator, brake, wheel or tire which prevents the braking wheel from operating normally to generate a braking force, the HMS 402 reports the failure to the ATM 401. The ATM 401 then reconfigures the BCS 400 to use the maximum torque measurement $T_w$ from the other braking wheels in the place of the torque measurement for the inoperable braking wheel. In this way torque equalisation may remain operational despite the sensor failure but with a bias towards the wheel generating the highest braking torque.

Similarly, in the case of a failure of a component or sensor affecting the operation of brake temperature equalisation, BG feedback or tire-runway μ feedback, the ATM 401 may reconfigure the BCS 400 to use an alternative value to enable the continued operation of the respective feedback loops.

If there is a failure affecting a brake actuator, brake, wheel or tire which prevents the braking wheel from operating normally to generate a braking force, an error is created between the MLG force command $Fx_M*$ and the longitudinal force feedback signal $Fx_M$. The feedback loop acts to minimise the error to maintain control over the braking force generated by the MLG undercarriage as described above. If the load sensor providing the longitudinal force signal $Fx_M$ fails, the ATM 401 reconfigures the BCS 400 to generate an alternative value, for example by dividing the braking torque at each wheel by the average wheel radius and adding the longitudinal braking force from each wheel.

The ATM 401 generally enables each of the control feedback loops of the BCS 400 to be operated to maximise braking performance and improve control of the braking forces generated in failure modes, i.e. by reconfiguring the BCS to use alternative data to maintain closed loop control. In the event that closed loop control is no longer available for one or more of the feedback loops, the ATM reconfigures the BCS to disable the unavailable feedback loop(s) so that parts of the BCS run open loop control. Any one of the feedback loops may be enabled or disabled by the ATM 401 individually, and may be operated in any combination with the other available feedback loops in any combination as required. The ATM therefore allows improved performance and control of braking particularly in failure modes.

The ATM 401 may also selectively enable and disable the feedback loops as desired to prioritise a particular functionality of the BCS 400 according to a pilot controlled input requesting engagement or disengagement of a specific function or functions or according to an automatic input based on aircraft operating conditions. For example, in a situation in which maximum braking force is desired, for example in a rejected take-off, it is desirable to maximise the total braking force while minimising asymmetric braking which may affect the heading of the aircraft 1. The ATM may therefore enable the torque equalisation module 108b and the brake gain measurement unit 110a feedback loops to maximise control over the braking force generated by each undercarriage and disable the temperature equalisation module 108c because equalising brake temperature is a lesser priority. Prioritisation of load control and equalisation over temperature equalisation may, for example, be initiated by detection of a braking force command or deceleration command in excess of a threshold.

The ATM may also enable the temperature equalisation module 108c feedback loop to reduce temperature scatter and disable the torque equalisation module 108b if reducing temperature scatter is determined to be the greater priority, for example if a temperature differential exceeds a threshold. The ATM may then resume operation of the torque equalisation module 108b in combination with the temperature equalisation module 108c when the temperature differential falls below a threshold.

Each yaw rate command r* output by the lateral control device 111 is received by a yaw rate controller 112 which also receives data representative of the current aircraft yaw rate r, the maximum achievable turning moment to be generated by steering using the steering wheels $Mz_{St_{13}max}$, the maximum achievable turning moment to be generated by differential braking $MZ_{DB\_max}$ and the MLG reaction moment $Mz_{MLG}$ (i.e. reaction moment from the MLG undercarriages 11, 12 to changes in yaw) from the feedback module 200. The yaw rate controller 112 uses this data to determine a yaw moment about the z axis which is required to achieve the commanded yaw rate for the aircraft 1, and outputs an aircraft yaw moment command $MZ_{AC}$* representative of the required yaw moment.

The aircraft yaw moment command $Mz_{AC}$* is received by a dispatch module 113 which also receives a moment dispatch coefficient κ representative of the operating conditions of the runway and/or the aircraft. The dispatch coefficient may be used to apply a correction factor or a limit to the yaw moment command $Mz_{AC}$*. The dispatch module outputs a z moment command Mz* representative of the desired yaw moment to be generated by the landing gear.

The z moment command Mz* is received by the aircraft force and moment controller 104 which also receives data representative of the yaw moment due to steering Mz and the yaw moment reaction force from the MLG undercarriages $Mz_{MLG}$ from the feedback module 200. The force and moment controller 104 uses the current aircraft yaw moment to apply a correction to the z moment command Mz*, and outputs a corrected turning moment command $Mz_c$.

The corrected turning moment command $Mz_c$ is received by the force distributor 105 which also receives a signal representative of the maximum achievable lateral force $Fy_{N\_max}$ to be generated by the NLG undercarriage from a slip protection module 114. The slip protection module 114 receives signals representative of the nose wheel angle $θ_{NW}$, NLG lateral force $Fy_N$ and NLG-ground reaction force $Fz_N$, as well as a signal representative of the DoT from a NLG DoT calculation module 114', which calculates the current DoT based on the current aircraft yaw rate r, longitudinal speed U and lateral speed V. The force distributor 105 outputs a NLG lateral force command $Fy_N$* representative of the lateral force (in the y direction) to be generated by the NLG undercarriage 10. The force distributor 105 also receives a DB activation signal $DB_{ACTIVE}$ from the slip protection module to activate differential braking if this is determined to be required, for example if the commanded turning moment cannot be achieved by steering alone or if steering efficiency could be improved by DB. If differential braking is determined to be desirable, the force distributor 105 outputs an MLG lateral force command to the MLG undercarriages to activate differential braking. The force distributor 105 also receives a DB authority signal $κ_{DB}$ for confirming whether or not DB may occur, so that the activation of DB may be controlled by a pilot or co-pilot or another control system.

The NLG lateral force command $Fy_N$* is received by a NLG force controller 115 which also receives data representative of the normal reaction force between the steering wheels 13 and the runway $Fz_N$ (i.e. force in the z direction) and the current lateral steering force $Fy_N$ (i.e. force in the y direction). The NLG force controller 115 uses this data to calculate a required slip angle to generate the commanded NLG lateral force $Fy_N$* and outputs a slip angle command $S_{NW}$. The NLG force controller 115 also receives data representative of the maximum slip angle $S_{NW\_max}$ to avoid skidding of the steering wheels 13 from the slip protection module 114 and limits the output slip angle command $S_{NW}$ if it exceeds the maximum slip angle $S_{NW\_max}$.

When the lateral control device 111 outputs a DoT command β and a yaw rate command r*, the commands pass through a switch 115 which is used to select either the DoT command β or the yaw rate command r*. If the yaw rate command r* is selected a beta calculation module 116 calculates a DoT command β based on the inputted yaw rate command r* to achieve the desired yaw rate. If the DoT command β is selected the DoT command bypasses the beta calculation module 116 and is not changed. The DoT command β (originating either as DoT command or a yaw rate command from the lateral control device) then passes through a rate limiter 117 which acts to limit the rate of change of the DoT command.

The limited DoT command β and the slip angle command SNW output by the NLG force controller 115 are then combined to give a nose wheel angle command $θ_{NW}$* representative of the desired nose wheel angle. The nose wheel angle command $\theta_{NW}^*$ is received by a steering servo controller for the steering actuator which sets the nose wheel angle to steer the aircraft 1.

An axis tracking module 118 is also provided which may be used to automatically output a DoT command β and a yaw rate command r* when the pilot requests automatic steering of the aircraft 1 to a desired location. The DoT command β and a yaw rate command r* output by the tracking module 118 are used in the same way as the equivalent commands from the lateral control device 111 as discussed above.

The embodiment described above gives specific examples of how a task manager may be used to reconfigure a brake control system to change the way in which the brake control system uses input signals. The skilled person will appreciate that a similar task manager may be used to reconfigure another brake control system having a different set of input signals used to control brake commands, and may control the use of any number of input signals in any number of independent or combined feedback loops.

In an alternative embodiment the brake control system may not be part of an integrated braking and steering control system.

In an alternative embodiment, the health monitoring system and task manager may be a combined health monitoring system and task manager.

In an alternative embodiment, an aircraft may have any number of undercarriages with braking wheels, and any one or more of the braking undercarriages may have a BCS with a task manager in accordance with the appended claims. One or more of the undercarriages may include a bogie supporting a plurality of wheels on a plurality of axles.

In an alternative embodiment, a BCS may output brake commands to control the operation of braking wheels across a plurality of undercarriages.

A brake control system having an automatic task manager for reconfiguring the use of input data to determine brake commands may be designed into an aircraft braking system or alternatively retrofitted to an existing aircraft braking system.

Although the invention has been described above with reference to one or more preferred embodiments, it will be appreciated that various changes or modifications may be made without departing from the scope of the invention as defined in the appended claims. Any feature or combination of features from any embodiment may be combined with any feature or combination of features from any other embodiment.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft braking system for braking an aircraft, comprising:
   a plurality of braking wheels and brakes applied to the braking wheels, and
   a braking control system configured to receive input of sensor signals from sensors representative of a plurality of measured aircraft parameters, and to output a plurality of brake commands to the brakes associated with the braking wheels according to a brake torque distribution, wherein the braking control system includes:
      a health monitoring system configured to determine an operability and/or a reliability of the sensor signals and/or of the braking wheels, and
      a task manager configured to automatically reconfigure the braking control system so as to change the manner in which the braking control system utilizes the sensor signals in the event that the health monitoring system judges a failure of one or more of the braking wheels or sensor signals;
   wherein the braking control system is further configured to control a prioritization of the brake torque distribution among the available braking wheels to prioritize at least one prioritization criteria over at least one other prioritization criteria in response to detected events under normal and failure conditions, wherein the prioritization criteria include at least two of a group comprising: brake torque equalization; maximum total braking force; asymmetric braking; brake temperature scatter; load control; undercarriage loading; wear rates of braking components; performance variations between brakes due to temperature difference; aircraft turn-around time (TAT); reduced pilot and control system workload.

2. The aircraft braking system according to claim 1, wherein the aircraft parameters include one or more of: aircraft speed, aircraft longitudinal braking force, wheel brake torque, wheel brake temperature, wheel brake pressure, or aircraft weight.

3. The aircraft braking system according to claim 1, further configured to receive a total braking force commanded to be developed, in use, by the available braking wheels of the aircraft.

4. The aircraft braking system according to claim 3, wherein the braking control system is configured to minimize error between the commanded braking force and the actual braking force developed, in use, by the braking wheels.

5. The aircraft braking system according to claim 1, further configured to prioritize equalizing the torque applied by the brake actuators to the available braking wheels over at least one other of the prioritization criteria.

6. The aircraft braking system according to claim 1, further configured to prioritize equalizing the brake temperature of the available braking wheels over at least one other of the prioritization criteria.

7. The aircraft braking system according to claim 1, further configured to optimize usage of the available braking wheels by trading the prioritization of brake torque equalization against reducing brake temperature scatter.

8. The aircraft braking system according to claim 1, further configured to estimate a brake gain of each braking wheel based upon input signals representative of the brake torque and brake pressure for that wheel.

9. The aircraft braking system according to claim 1, further configured to estimate a runway-tire friction coefficient based upon input signals representative of the aircraft weight and either the total braking torque or the aircraft longitudinal braking force developed in use.

10. The aircraft braking system according to claim 1, wherein the input signals from the sensors are representative of real-time measured aircraft parameters to provide closed-loop braking control.

11. The aircraft braking system according to claim 10, wherein at least some of the input signals are estimates of some aircraft parameters based upon other measured aircraft parameters to provide open-loop braking control, and wherein the system automatically reverts to open-loop control when closed-loop control is unavailable or is unreliable.

12. The aircraft braking system according to claim 1, wherein at least some of the input signals are estimates of some aircraft parameters based upon other measured aircraft parameters to provide open-loop braking control.

13. The aircraft braking system according to claim 1, wherein one or more functions of the system are selectively enabled without disrupting continuous operation of the braking system.

14. The aircraft braking system according to claim 13, wherein the one or more functions are enabled by a pilot-controlled input and/or automatically based upon aircraft operating conditions.

15. A method for operating an aircraft having a plurality of braking wheels, the method comprising:
   receiving input of sensor signals from sensors representative of a plurality of measured aircraft parameters,
   outputting a plurality of brake commands to brakes associated with the braking wheels according to a brake torque distribution,
   determining the operability and/or reliability of the sensor signals and/or of the braking wheels;
   automatically self-reconfiguring the manner in which the input sensor signals are utilized in the event that a failure of one or more of the braking wheels or sensor signals is determined, and
   controlling the prioritization of the brake torque distribution among the available braking wheels to prioritize at least one of the following prioritization criteria over at least one other of the prioritization criteria in response to detected events under normal and failure conditions, wherein the prioritization criteria comprises: brake torque equalization; maximum total braking force; asymmetric braking; brake temperature scatter; load control; undercarriage loading; wear rates of braking components; performance variations between brakes due to temperature difference; aircraft turn-around time (TAT); reduced pilot and control system workload.

16. The method according to claim 15, further comprising receiving a total braking force commanded to be developed, in use, by the available braking wheels of the aircraft, and minimizing any error between the commanded braking force and the actual braking force developed, in use, by the braking wheels.

17. The method according to claim 15, further comprising prioritizing equalizing the torque applied by the brake actuators to the available braking wheels; and/or equalizing the brake temperature of the available braking wheels; and/or optimizing usage of the available braking wheels by trading brake torque equalization against reducing brake temperature scatter over at least one other of the prioritization criteria.

18. The method according to claim 15, further comprising estimating a brake gain of each braking wheel based upon input signals representative of the brake torque and brake pressure for that wheel.

19. The method according to claim 15, further comprising estimating a runway-tire friction coefficient based upon input signals representative of the aircraft weight and either the total braking torque or the aircraft longitudinal braking force developed in use.

20. The method according to claim 15, wherein the input signals from the sensors are representative of real-time measured aircraft parameters to provide closed-loop braking control.

* * * * *